United States Patent Office 3,433,438
Patented Mar. 18, 1969

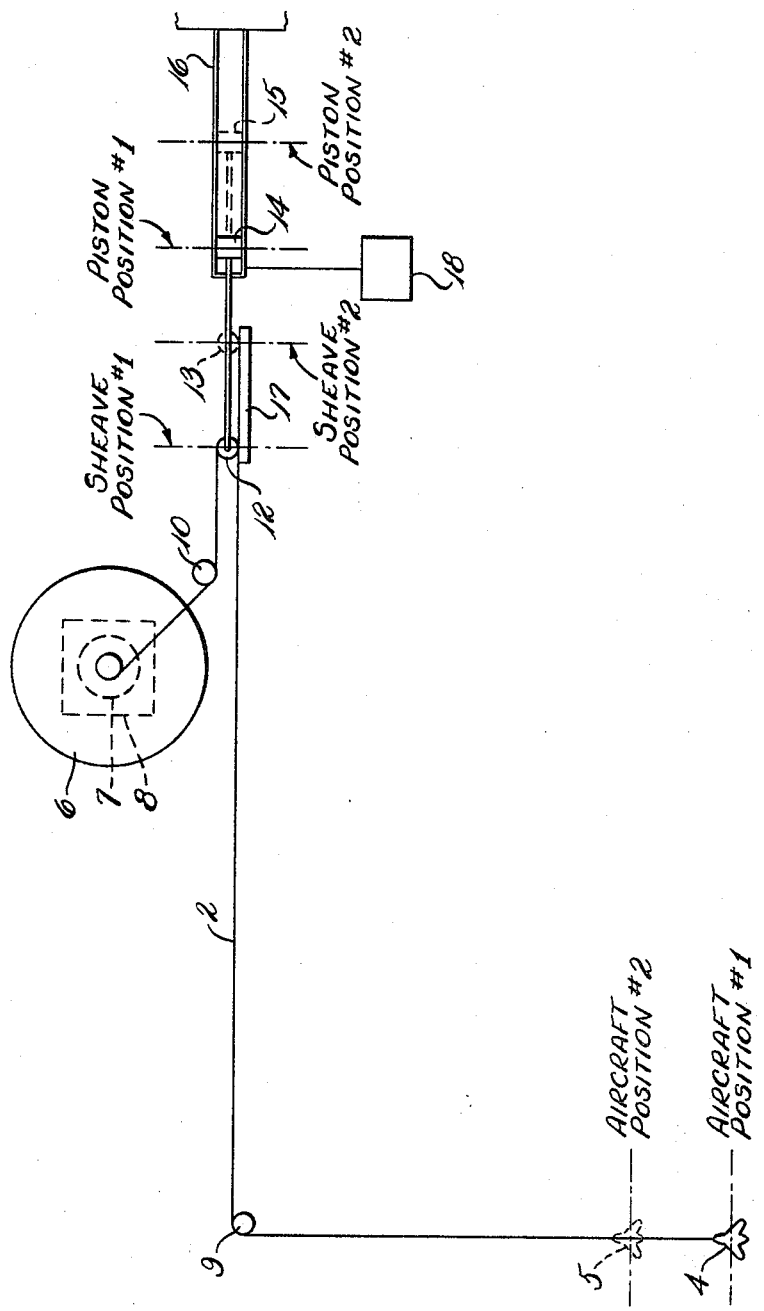

3,433,438
AIRCRAFT LAUNCHING DEVICE
Robert W. Cruger, Springfield, William E. Petransky, Lansdowne, and Melvin I. Weiss, Broomall, Pa., assignors to E. W. Bliss Company, Canton, Ohio, a corporation of Delaware
Filed Nov. 14, 1966, Ser. No. 593,958
U.S. Cl. 244—63          7 Claims
Int. Cl. B64f 1/04

ABSTRACT OF THE DISCLOSURE

An aircraft launching device includes a wind-up mechanism for a purchase tape connected with an aircraft. The wind-up mechanism is connected to a motor through a clutch. To reduce clutch slippage in the wind-up mechanism when imparting movement to a stationary aircraft, an initial velocity is imparted to the aircraft by a pre-launch accelerator. Once the aircraft is brought up to an initial velocity by the prelaunch accelerator, the clutch of the wind-up mechanism is engaged to bring the aircraft up to launching speed.

---

This invention relates to the art of vehicle accelerating systems, and more particularly to an improved aircraft launching device.

The present invention is particularly applicable to launching or catapulting an aircraft, and it will be described with particular reference thereto. However, it will be appreciated that the invention has broader applications and may be used in various other vehicle accelerating systems.

One of the popular systems for catapulting aircraft involves the use of a linear element operatively connected at one end to a wind-up mechanism and having a free end adapted for connection to the aircraft. The wind-up mechanism is operated by a power source connected thereto by a clutch. Due to the tremendous inertia which must be overcome to accelerate an aircraft from a rest position, high energy losses to clutch slippage are experienced during the initial clutch lock-up. Clutch slippage dissipates energy in the form of heat and results in excessive clutch deterioration and limited clutch life. Attempts to overcome this problem by using larger clutches and providing auxiliary cooling means have not proved entirely satisfactory because these modifications adversely affect the performance and efficiency of the over-all launching device. Even if clutch slippage could be tolerated in terms of satisfactory clutch life, an oversized and therefore more expensive power source would be required to transmit enough rotational energy to the wind-up mechanism to provide the high rate of acceleration needed to satisfactorily catapult an aircraft from a reasonable length of runway.

These disadvantages of the prior art system have been overcome by the present invention which is directed to an aircraft launching device which includes a pre-launch accelerator imparting a preliminary, relatively low accelerating velocity to the aircraft prior to the engagement of the clutch driving the wind-up mechanism. After the aircraft is in motion the clutch is locked up thereby imparting through the wind-up mechanism and linear element, a secondary accelerating velocity which increases up to a launch velocity. The advantage of this system is that it possesses the capability of rapidly locking up the clutch and virtually eliminating high energy losses due to clutch slippage. This in turn results in longer clutch life and improves the system's performance, efficiency and reliability.

In accordance with the present invention there is provided, in a vehicle accelerating device comprising a linear element operatively connected at one end to a wind-up mechanism and having a free end adapted for connection to a vehicle, the improvement comprising: means forming a loop in the linear element intermediate its ends, means operative to increase the length of linear element forming the loop while simultaneously foreshortening the length of linear element between the loop and its free end, thereby imparting a preliminary accelerating velocity to the free end of the linear element, and means operative to actuate the wind-up mechanism thereby imparting a secondary accelerating velocity to the free end of the linear element.

It is therefore an object of the invention to provide an improved vehicle accelerating device which obviates certain disadvantages of prior art systems.

A further object of the invention is to provide an improved vehicle accelerating device in which a preliminary accelerating velocity is imparted to the vehicle before the clutch in the power train driving the wind-up mechanism, is locked up.

Yet another object of the invention is to provide an improved vehicle accelerating device which virtually eliminates high energy losses due to clutch slippage.

These and other objects and advantages will become apparent from the following detailed description of the preferred embodiment of the invention when read in connection with the accompanying drawing in which the sole figure is a schematic top view of the preferred embodiment.

Referring now to the drawing wherein the showings are for purposes of illustrating a preferred embodiment of the invention only and not for the purpose of limiting the same, the figure shows a runway installed aircraft launching device comprising a linear element 2, having a free end adapted for connection to an aircraft 4, and its other end connected to the hub of wind-up reel 6 which together with clutch 7 and power source 8 comprise a wind-up mechanism. Linear element 2, may take the form of a metal cable or a belt, preferably the latter. The belt may take a variety of forms; however, in accordance with a limited aspect of the invention, the belt is a woven tape formed from a synthetic material, such as nylon. Such a tape is described in detail in United States Letters Patent No. Re. 25,406 which is incorporated by reference herein to the extent necessary for a complete understanding of a woven belt suitable for use in the practice of the present invention.

Linear element 2, engages stationary sheaves 9, 10, forming a loop therebetween. At the bight of the loop is positioned a movable sheave 12 which is connected to piston 14 of a hydraulic cylinder 16. Pressurized hydraulic fluid is supplied to the cylinder 16 from accumulator 18. Sheave 12 is guided for movement by cross-head 17.

The operation of the aircraft launching device is as follows: with the aircraft in battery position as shown in full lines at 4, hydraulic fluid under pressure is delivered to hydraulic cylinder 16 behind piston 14 causing the piston to move to the right, as shown in the drawing, toward the dotted position 15. This causes movable sheave 12 to move to the right, as shown in the drawing, along cross-head 17 to dotted position 13. The movement of sheave 12 has the effect of increasing the length of linear element forming the loop while simultaneously foreshortening the length of linear element between the loop and its free end adapted to be connected to the aircraft. This foreshortening causes the aircraft 4 to move down the runway toward dotted position 5.

As piston 14 reaches the end of its stroke there has been imparted to the free end of linear element 2, and to the aircraft connected thereto, a preliminary accelerating velocity. Up to this point clutch 7 has been in a disengaged configuration. Upon the completion of piston 14's stroke clutch 7, by conventional means not shown, is engaged causing the transmission of rotary power from power source 8 to windup reel 6. As the reel begins to turn there is imparted to the free end of linear element 2, and to the aircraft attached thereto, a secondary accelerating velocity which carries the aircraft up to a launch velocity. Due to the fact that the inertia of the aircraft at rest was overcome prior to the engagement of clutch 7 the clutch can be locked up rapidly with a virtual elimination of slippage.

Various ratios of piston stroke to travel of linear element 2 can be obtained by the use of multiple sheaves to form the loop portion of the linear element.

Ideally the aircraft velocity at the time clutch 7 is engaged should be nearly equal to the corresponding velocity of linear element 2 at the hub of the reel 6 at the moment clutch 7 is engaged. This will permit a smooth acceleration of the aircraft during the entire launch cycle.

The present invention has been described in conjunction with certain structural embodiments; however it is to be appreciated that various structural changes may be made in the illustrated embodiment without departing from the intended scope and spirit of the present invention.

Having thus described our invention, we claim:

1. In a vehicle accelerating device comprising a linear element operatively connected at one end to a wind-up mechanism and having a free end adapted for connection to a vehicle, the improvement comprising: means forming a loop in said linear element intermediate its ends, means operative to increase the length of linear element forming said loop while simultaneously foreshortening the length of linear element between said loop and said free end, thereby imparting a preliminary accelerating velocity to the free end of said linear element, and means operative to activate said wind-up mechanism thereby imparting a secondary accelerating velocity to the free end of said linear element.

2. The device as defined in claim 1, wherein said loop forming means comprises a pair of stationary sheaves.

3. The device as defined in claim 1 wherein said wind-up mechanism comprises a power source and a clutch operative to connect said power source to said wind-up mechanism.

4. The device as defined in claim 1 wherein said linear element is a woven belt.

5. The device as defined in claim 4 wherein said woven belt is formed from a synthetic material.

6. The device as defined in claim 1, wherein said means operative to increase the length of linear element forming said loop comprises a movable sheave positioned at the bight of said loop.

7. The device of claim 1 wherein said means operative to increase the length of linear element forming said loop is designed to accelerate said free end to a velocity substantially equal to the velocity imparted to said linear element when said wind-up mechanism is initially activated.

References Cited

UNITED STATES PATENTS

| | | | |
|---|---|---|---|
| 922,711 | 5/1909 | Means | 244—63 |
| 1,384,036 | 7/1921 | Anderson | 244—63 |
| 1,532,630 | 4/1925 | Methlin | 244—63 |
| 1,535,475 | 4/1925 | Jeansen et al. | 244—63 |
| 2,488,525 | 11/1949 | Cotton. | |
| 3,220,216 | 11/1965 | Byrne et al. | 244—63 |

FOREIGN PATENTS 358,763    4/1938    Italy.

FERGUS S. MIDDLETON, *Primary Examiner.*

P. E. SAUBERER, *Assistant Examiner.*